(12) United States Patent
Deselaers et al.

(10) Patent No.: US 12,223,954 B2
(45) Date of Patent: Feb. 11, 2025

(54) AUTOMATED ASSISTANT CONTROL OF EXTERNAL APPLICATIONS LACKING AUTOMATED ASSISTANT APPLICATION PROGRAMMING INTERFACE FUNCTIONALITY

(71) Applicant: Google LLC, Mountain View, CA (US)

(72) Inventors: Thomas Deselaers, Zurich (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/058,895

(22) PCT Filed: Nov. 10, 2020

(86) PCT No.: PCT/US2020/059885
§ 371 (c)(1),
(2) Date: Nov. 25, 2020

(87) PCT Pub. No.: WO2021/247070
PCT Pub. Date: Dec. 9, 2021

(65) Prior Publication Data
US 2024/0249719 A1     Jul. 25, 2024

Related U.S. Application Data

(60) Provisional application No. 63/033,496, filed on Jun. 2, 2020.

(51) Int. Cl.
*G10L 15/22* (2006.01)
*G06F 3/16* (2006.01)
(Continued)

(52) U.S. Cl.
CPC ............. *G10L 15/22* (2013.01); *G06F 3/167* (2013.01); *G06F 9/547* (2013.01); *G10L 15/063* (2013.01);
(Continued)

(58) Field of Classification Search
CPC ....... G10L 15/22; G06F 3/048; G06F 40/295; G06F 16/35; G06F 3/0481
See application file for complete search history.

(56) References Cited

U.S. PATENT DOCUMENTS

| | | | |
|---|---|---|---|
| 10,311,492 B2 | 6/2019 | Gelfenbeyn et al. | |
| 2016/0349935 A1* | 12/2016 | Gelfenbeyn | G06Q 30/0601 |

(Continued)

FOREIGN PATENT DOCUMENTS

| | | |
|---|---|---|
| CN | 109886330 | 6/2019 |
| CN | 110176226 | 8/2019 |
| CN | 110767220 | 2/2020 |

OTHER PUBLICATIONS

European Patent Office; Extended European Search Report issued in Application No. 22172659.9, 10 pages, dated Aug. 18, 2022.

(Continued)

*Primary Examiner* — Feng-Tzer Tzeng
(74) *Attorney, Agent, or Firm* — Gray Ice Higdon

(57) ABSTRACT

Implementations relate to an automated assistant that is capable of interacting with non-assistant applications that do not have functionality explicitly provided for interfacing with certain automated assistants. Application data, such as annotation data and/or GUI data, associated with a non-assistant application, can be processed to map such data into an embedding space. An assistant input command can then be processed and mapped to the same embedding space, and a distance from the assistant input command embedding and the non-assistant application data embedding can be deter- (Continued)

mined. When the distance between the assistant input command embedding and the non-assistant application data embedding satisfies threshold(s), the automated assistant can generate instruction(s), for the non-assistant application, that correspond to the non-assistant application data. For instance, the instruction(s) can simulate user input(s) that cause the non-assistant application to perform one or more operations characterized by, or otherwise associated with, the non-assistant application data.

15 Claims, 6 Drawing Sheets

(51) Int. Cl.
    *G06F 9/54*     (2006.01)
    *G10L 15/06*     (2013.01)
    *G06F 3/048*     (2013.01)

(52) U.S. Cl.
    CPC ........ *G06F 3/048* (2013.01); *G10L 2015/223* (2013.01); *G10L 2015/228* (2013.01)

(56) References Cited

U.S. PATENT DOCUMENTS

| | | | | |
|---|---|---|---|---|
| 2016/0364382 A1* | 12/2016 | Sarikaya | ................. | G06F 40/40 |
| 2018/0232443 A1* | 8/2018 | Delgo | .................... | G06F 16/35 |
| 2018/0261223 A1 | 9/2018 | Jain et al. | | |
| 2019/0180746 A1 | 6/2019 | Diwan et al. | | |
| 2019/0197396 A1 | 6/2019 | Rajkumar | | |
| 2019/0297039 A1 | 9/2019 | Rodriguez et al. | | |
| 2019/0340200 A1 | 11/2019 | Coimbra et al. | | |
| 2019/0361575 A1 | 11/2019 | Ni et al. | | |

OTHER PUBLICATIONS

Intellectual Property India; Examination Report issued in Application No. 202227064279; 9 pages; dated Jan. 31, 2023.
International Search Report and Written Opinion of Ser. No. PCT/US2020/059885; 15 pages; dated Feb. 17, 2021.
European Patent Office; Intention to Grant issued in Application No. 20820621.9, 45 pages, dated Jan. 3, 2022.
European Patent Office; Communication pursuant to Article 94(3) EPC issued in Application No. 22172659.9, 6 pages, dated May 15, 2024.
China National Intellectual Property Administration; Notification of First Office Action issued in Application No. 202080101499.9; 29 pages; dated May 22, 2024.
Canada Patent Office; Examiner's Report issued in Application No. 3181228; 9 pages; dated May 27, 2024.
Intellectual Property India; Hearing Notice issued in Application No. 202227064279; 3 pages; dated Sep. 25, 2024.
China National Intellectual Property Administration; Notification of Second Office Action issued in Application No. 202080101499.9; 6 pages; dated Oct. 24, 2024.

* cited by examiner

AUTOMATED ASSISTANT CONTROL OF EXTERNAL APPLICATIONS LACKING AUTOMATED ASSISTANT APPLICATION PROGRAMMING INTERFACE FUNCTIONALITY

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

As mentioned above, an automated assistant can convert audio data, corresponding to a spoken utterance of a user, into corresponding text (or other semantic representation). For example, audio data can be generated based on detection of a spoken utterance of a user via one or more microphones of a client device that includes an assistant interface for enabling the user to interact with an automated assistant. The automated assistant can include a speech recognition engine that attempts to recognize various characteristics of the spoken utterance captured in the audio data, such as the sounds produced (e.g., phonemes) by the spoken utterance, the order of the produced sounds, rhythm of speech, intonation, etc. Further, the speech recognition engine can identify text words or phrases represented by such characteristics. The text can then be further processed by the automated assistant (e.g., using a natural language understanding (NLU) engine and/or a dialog state engine) in determining responsive content for the spoken utterance. The speech recognition engine can be implemented by the client device and/or by one or more automated assistant component(s) that are remote from, but in network communication with, the client device.

When a user is concurrently interacting with an automated assistant and an application (e.g., web browser), inputs to the application can result in interruptions to actions being performed by the automated assistant, and vice a versa. Moreover, the invoking of an automated assistant while accessing an application can be assumed by many systems to be an indication that the user is no longer interested in further interactions with the application, and cause the application to pause certain operations or close. This can waste computational resources when the user is actually intending to cause the automated assistant to perform an action related to the application and/or another application. In such instances, any data previously generated during interaction with the application can be lost, thereby forcing the user to re-initialize the application and/or repeat any previous operations with the application.

Automated assistants can have limited functionality when a user is operating other applications. As a result, a user may attempt to invoke an automated assistant to perform certain function(s) that the user associates with other application(s) (i.e., attempt to have the automated assistant control the other application(s)), but may ultimately terminate a dialog session with the automated assistant when the automated assistant cannot perform such function(s). For example, the limited availability or limited functionality of automated assistants may mean that users are unable to control other applications via voice commands processed via the automated assistant. This can waste computational resources, such as network and processing bandwidth, because any processing of spoken utterances during the dialog session would not have resulted in performance of any action(s) with the other application(s). Furthermore, because of this deficiency, as a user interacts with their respective automated assistant, the user may avoid operating other applications that could otherwise provide efficiency for various tasks performed by the user.

SUMMARY

Implementations set forth herein relate to using an automated assistant to cause a separate application to perform certain function(s), wherein causing the separate application to perform the certain function(s) is performed independent of any automated assistant application programming interface (API) of the separate application. Put another way, the automated assistant API (if any) of the separate application can lack capabilities for performing the certain function(s). However, implementations disclosed herein can nonetheless use the automated assistant to control the separate application in performing the certain function(s). In these and other manners, the automated assistant can be utilized in controlling various disparate separate application(s), without necessitating those separate applications incorporate certain (or even any) automated assistant API function(s). Controlling the separate application(s) via the automated assistant can enable control of the separate application(s) via spoken inputs that are processed by the automated assistant—whereas the separate application(s) can lack functionality for processing certain (or any) spoken inputs. In addition to increasing input modalities available for control of the separate application and being beneficial for users with limited dexterity, enabling control of function(s) of separate applications via spoken inputs can enable those function(s) to be performed more quickly and, as a result, can lead to a shorter overall duration of interactions with the separate applications. For example, providing a spoken input to perform a function can be more time efficient than navigating within the separate application to locate user interface element(s) for the function and interacting then with those user interface element(s). Additionally or alternatively, separate application(s) that lack the certain automated assistant API function(s) can, as a result, occupy less on-device storage and/or can utilize less random access memory (RAM) when executing.

As one example, a variety of different applications can be installed at a computing device, and each application can perform a variety of different operations in response to a variety of different user input(s) directed to the application. An automated assistant, that is separate from the applications, can also be accessible via the computing device and at least an automated assistant client, of the automated assistant, can be installed at the computing device. Typically, the automated assistant may not be able to cause one or more of the applications to perform certain (or even any) operation(s). This can be a result of those application(s) not being programmed with any functionality for interfacing with the automated assistant, or only being programmed for a limited amount of interfacing with the automated assistant. However, implementations disclosed herein enable an automated assistant to control other non-assistant applications to cause performance of those certain operation(s) independent of any API. This can expand functionality for the automated assistant and the other applications, while also preserving various computational resources. In some implementations, an automated assistant can utilize one or more trained machine learning models in causing another application to perform particular operation(s) in response to input command(s) from a user. In other words, using one or more trained machine learning models, the automated assistant can cause performance of an operation by a separate application, which the automated assistant may not otherwise be able to cause performance of (e.g., via an API).

In some implementations, a first machine learning model can be trained using graphical user interface (GUI) data associated with other application(s), and a second machine learning model can be trained using natural language data. Additionally, each machine learning model can be associated with the same embedding space. For example, each machine learning model can have the same output dimensions, and the output dimensions can define the embedding space. For instance, the output dimension of each model can be 128×1, 64 by 2, or other dimension. The first and second machine learning models, though separate, can be trained cooperatively such that GUI data and natural language data, that correspond to one another, will be close (distance-wise) in the embedding space. On the other hand, GUI data and natural language data, that do not correspond to one another, will be farther away (distance-wise) in the embedding space.

For example, assume: (i) natural language data of "Turn on the lights", (ii) first GUI data of a non-assistant application that is a selectable button that includes an image of a light bulb and that, when selected, causes lights to be turned on, and (iii) second GUI data of the non-assistant application that is another selectable button that includes an image of a fan and that, when selected, causes a speed of the fan to be adjusted. The natural language data that includes "Turn on the lights" can be processed using the second machine learning model to generate a natural language embedding. The first GUI data can be processed using the first machine learning model to generate a first GUI embedding, and the second GUI data can be separately processed using the first machine learning model to generate a second GUI embedding. When the first and second machine learning models are trained, the first GUI embedding will be closer, distance-wise in the embedding space, to the natural language embedding than the second GUI embedding is to the natural language embedding. Based on the first GUI embedding being closer to the natural language embedding than the second GUI embedding to the natural language embedding (i.e., satisfying a relative threshold) and/or based on the embedding distance satisfying an absolute distance threshold, the first GUI data can be determined to more closely correspond to the natural language data.

In training the first and second machine learning models, positive pairings of natural language data and GUI data (i.e., natural language that describes interaction with the GUI data) can be used, and optionally negative parings of natural language data and GUI data (i.e., natural language that does not describe the interaction with the GUI data). For positive pairings, the natural language data can be processed using the second machine learning model to generate a predicted natural language embedding, and the GUI data can be processed using the first machine learning model to generate a predicted GUI embedding. Based on this positive pairing, an error can be determined by at least comparing the predicted natural language embedding to the predicted GUI embedding, with a goal being for the two embeddings to be the same, or at least close, in embedding space. The error can then be used to update both models. Negative pairings can be similarly processed during training, but with the goal being for the two embeddings to be far away in embedding space. Through training on positive and/or negative pairings, the models are trained such that corresponding natural language and GUI data pairs will—although being processed by separate models—when processed, result in corresponding embeddings that are more proximal in embedding space. On the other hand, non-corresponding natural language and GUI data pairs will—although being processed by separate models—when processed, result in corresponding embeddings that are less proximal in embedding space.

As one particular example, the automated assistant can have an ability to direct a separate external messaging application (e.g., "external" relative to an automated assistant application) to perform various operations in response to a user providing certain spoken commands to an interface of their respective computing device. The user can provide a particular spoken utterance to the automated assistant while the user is accessing the messaging application via their computing device in order to, for example, send a message that includes an image captured by a camera. The spoken utterance can be, "Assistant, send an image using my camera," and can be provided while the messaging application is rendered in a foreground of a display interface of the computing device. Natural language data that embodies the spoken utterance can be processed using the second machine learning model, and GUI data that is based on a GUI being rendered using the messaging application can be processed using the first machine learning model. The processing can result in a mapping of first data and second data in embedding space. The embedding space can have various regions associated with one or more operations capable of being performed by the messaging application.

The first data can correspond the processed GUI data and can map to multiple different localities in the embedding space, thereby indicating that the GUI being rendered by the messaging application is capable of initializing multiple different operations. In other words, the user can initialize the multiple different operations via selectable GUI elements being rendered via the messaging application. Furthermore, the second data can also map to one or more different localities in the embedding space, thereby indicating that that one or more different operations can be performed in order to fulfill one or more requests embodied in the spoken utterance from the user. In some instances, the first data and the second data can correspond to a common locality in the embedding space, which can be stored with assistant data. Based on this correspondence to a common locality, a selectable GUI element provided at the GUI of the messaging application can be identified, and the automated assistant can simulate a user input to the selectable element, in order to cause a requested operation to be performed (e.g., the operation corresponding to the common locality in the embedding space). For example, the common locality can correspond to one or more operations of opening a camera via the messaging application, capturing an image, and transmitting the image to a recipient via the messaging application.

Based on identifying the one or more operations corresponding to the common locality, and the automated assistant simulating the user input to the GUI, the automated assistant can cause the messaging application to fulfill the request from the user. For instance, in response to the user providing the spoken utterance, "Assistant, send an image using my camera," the automated assistant can provide one or more simulated inputs to the messaging application. The one or more simulated inputs can be generated and/or determined based on interaction data, which can be based on prior interactions between one or more users and the messaging application. In response, the messaging application can initialize a camera of the computing device, capture an image using the camera, and transmit the image to a recipient that the user is currently conversing with via the messaging application. In some instances, these operations can be performed as a backend process when the messaging application is not being rendered in a foreground of the computing device, in order to further preserve computational resources.

In some implementations, the automated assistant can operate using one or more trained machine learning models to identify an external application to communicate with in response to a spoken utterance being received when a user is not necessarily interacting with the external application. In other words, the user can provide a spoken utterance directed to the automated assistant for controlling an external application that is not executing in a foreground of a display panel and/or any other display interface of a computing device. Rather, the external application may not have been launched at the computing device when the user provides the spoken utterance. In order to accurately identify the external application that the user is referring to, and also identify one or more operations that will satisfy a request from the user, natural language content of the spoken utterance can be processed using the one or more trained machine learning models.

In some implementations, a trained machine learning model can be used to process natural language content associated with the spoken utterance in order to identify the external application and the one or more operations to be performed. In other implementations, a first trained machine learning model is used when identifying the external application, and a second trained machine learning model is used when identifying one or more operations for the identified external application to perform.

As an example, a user can be in their home and reading a book from their tablet computing device, which can provide access to an automated assistant and other non-assistant applications that are separately available from the automated assistant. The home of the user can have a variety of different smart power outlets that are controllable via a controls application that is installed on the tablet computing device. However, the controls application may not provide any functions and/or libraries explicitly provided for interfacing with an automated assistant. In order to control the smart power outlets via the automated assistant-without necessitating the user directly launch the controls application, the user can provide an input to the automated assistant. The input can be processed using one or more trained machine learning models in order to correlate the input to the controls application and/or one or more operations capable of being performed by the controls application.

For example, the input from the user to the automated assistant can be, "Assistant, turn on the outlet by the living room window." In response, the automated assistant can cause the input to be processed in order to determine that the user is intending to cause the automated assistant to direct the controls application to perform an "on" operation for an outlet that the controls application manages. Processing of the input can involve one or more trained machine learning models and/or one or more heuristic techniques in order to select a suitable application and/or operation to be performed. In some implementations, the automated assistant can employ one or more machine learning models that are trained using data that is provided via another application (e.g., the controls application) and/or stored in association with the application.

In some implementations, supplemental data such as meta data and/or XML data can be available at various other applications that are accessible via computing device that also provides access to an automated assistant. The supplemental data can be part of training data that is used to train one or more machine learning models to assist with mapping assistant inputs from a user with operations capable of being performed by other applications. For example, meta data associated with the controls application can include information describing certain selectable GUI elements, such as an on-off switch. The on-off switch can have corresponding meta data and/or XML data indicating that the GUI element is for controlling an outlet (e.g., "#controls smart outlet"). Furthermore, other data, such as other portions of code and/or GUI elements that can provide additional context for certain operations, can also be used to train the one or more machine learning models. For example, a portion of code can include "result=read('Living_Room_Window(status)')," thereby indicating that certain portions of a function that includes that portion of code may control a device associated with a "living room window." Therefore, processing of the input from the user can map to a locality of embedding space that also corresponds to the on-off switch GUI element, thereby allowing the automated assistant to simulate a user input (e.g., a touch input to a touch interface) for toggling the on-off switch GUI element in response to the user input.

In order to generate instances of training data for training the one or more machine learning models, one or more federated learning techniques can be employed. For example, the automated assistant can generate suggestions for spoken utterances for the user, which the user can repeat to the automated assistant to control an external application. A particular suggested command can be generated using various data that is associated with the external applications, such as GUI data, meta data, XML data, and/or any other data. For instance, data characterizing a device name and a selectable setting for the device can be processed in order to generate a suggested spoken utterance such as, "Assistant, turn the [device name] to [selectable setting]." The suggested spoken utterance can be provided by the user to the automated assistant in order to cause a particular application to perform one or more operations. Alternatively, the user can elect to not repeat the spoken utterance to the automated assistant.

The training data can be compiled to reflect whether the user repeats each suggested spoken utterance or not. In other words, suggested spoken utterances that are repeated by the user can be correlated to one or more application inputs and/or application operations. Furthermore, suggested spoken utterances that are not repeated by the user can be considered irrelevant, and therefore down-ranked and/or otherwise not stored in association with any external application operation. In some implementations, suggested spoken utterances and/or their corresponding natural language content can be mapped near one or more external application operations that are mapped in embedding space. However, as a result of a spoken utterance being suggested and not selected by a user (e.g., not selected within a threshold period of time), the spoken utterance can be moved further from an operation in embedding space. In other words, a spoken utterance that is predicted to be relevant to a particular external application operation can correspond to an embedding in embedding space. When one or more users do not employ the spoken utterance when the spoken utterance is suggested at a device interface, the distance of the embedding from the predicted operation in embedding space can be increased. However, in some implementations, the spoken utterance can be suggested again for another application and/or another operation. When a user selected the subsequently suggested spoken utterance, an embedding corresponding to the spoken utterance can be mapped closer to the other application and/or the other operation. In this way, federated learning can assist with creating an embeddings for correlating spoken utterances to an automated assistant with operations capable of being performed by another application that is external to the automated assistant.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
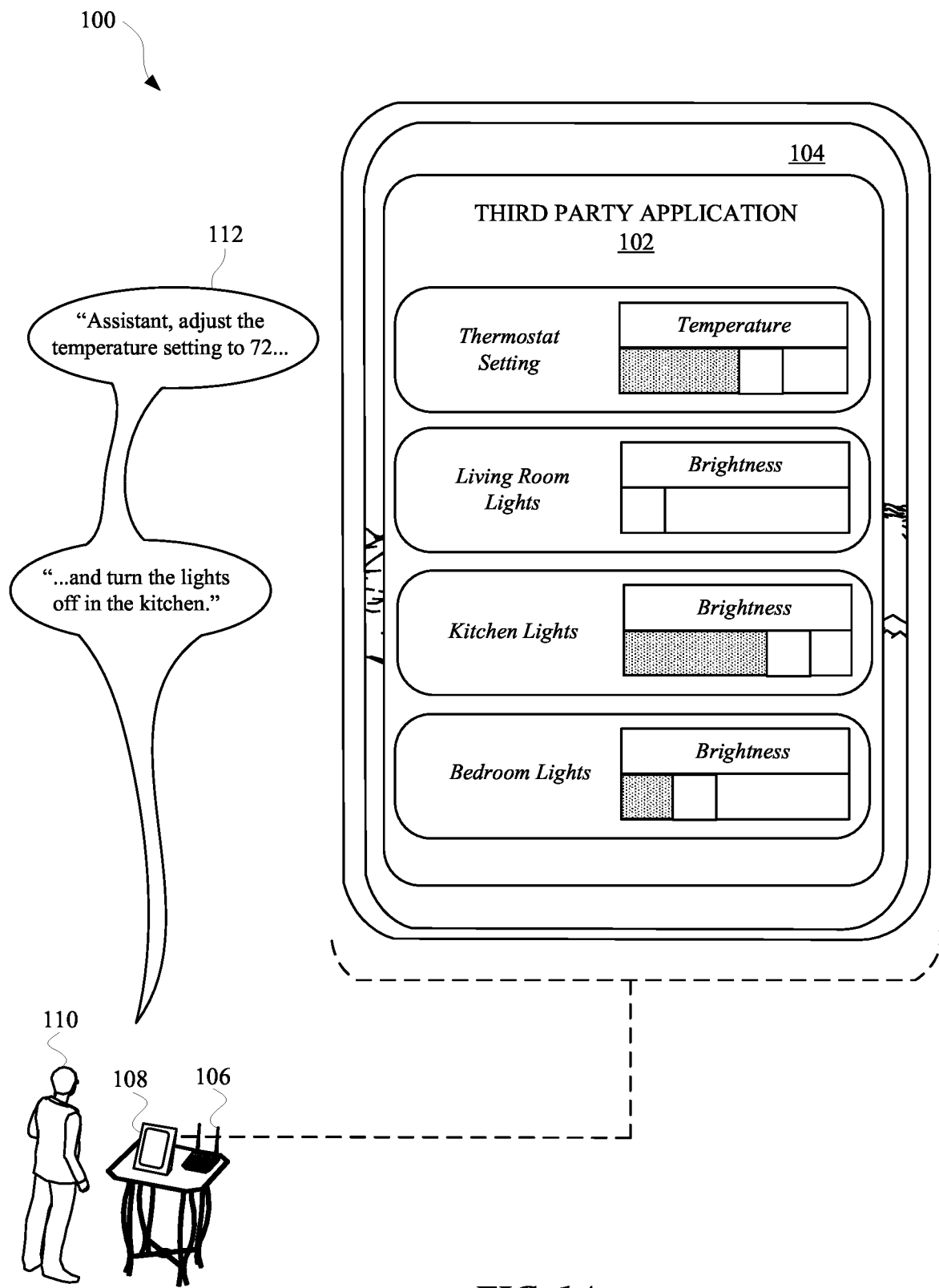
FIG. 1A, FIG. 1B, and FIG. 1C illustrate views of a user invoking an automated assistant to interact with a third party application, which does not have any pre-loaded API or library for interacting with an automated assistant.
Figure 1B:
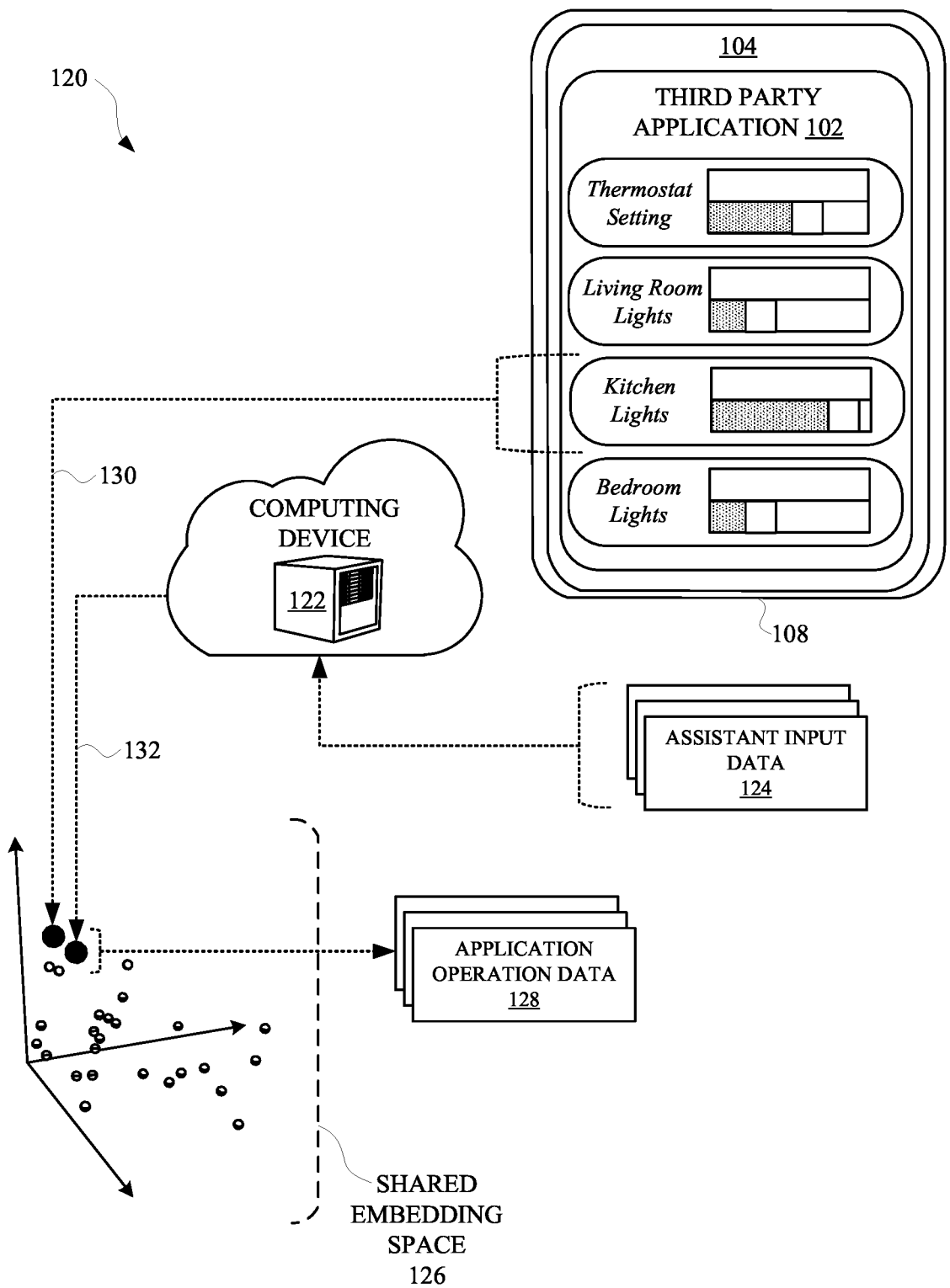
Figure 1C:
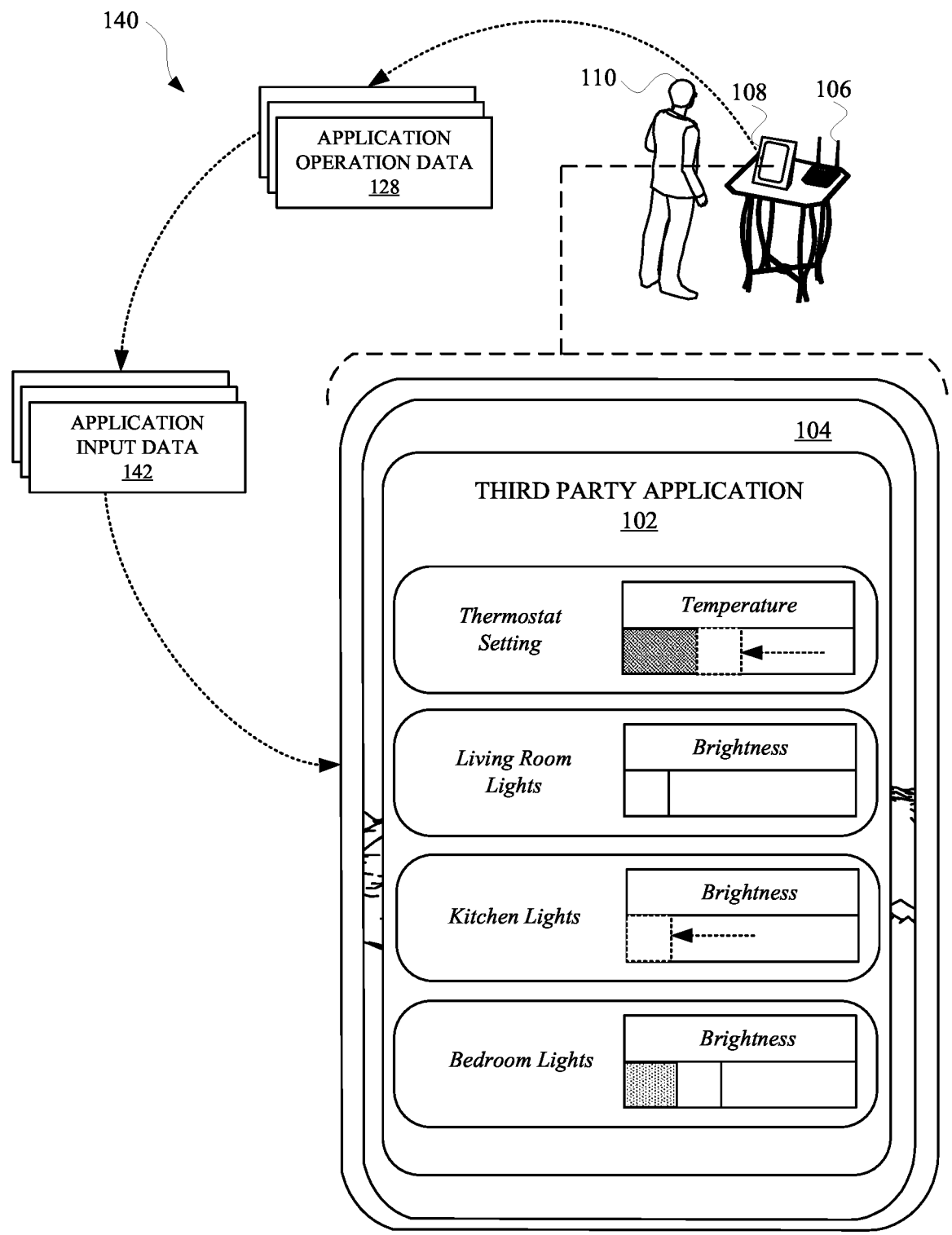

FIG. 1A, FIG. 1B, and FIG. 1C illustrate a view 100, a view 120, and a view 140 of a user 110 invoking an automated assistant to interact with a third party application 102, which does not have any pre-loaded API or library for interacting with an automated assistant. Rather, the automated assistant can develop processes with which to control the third party application 102 using data that is stored in association with the third party application 102. For example, the user 110 can provide a spoken utterance 112 such as, "Assistant, adjust the temperature setting to 72 and turn the lights off in the kitchen." The user 110 can provide the spoken utterance 112 while viewing or otherwise accessing a computing device 108 and/or a third party application 102. For example, the user 110 can be accessing the computing device 108, which can be connected to a network such as the internet via a wireless router 106, and therefore communicate with third party servers and other entities. The computing device 108 can render a graphical user interface via a display panel 104 for controlling a third party application 102. Then some implementations, the user 110 can provide the spoken utterance 112 for controlling one or more third party applications without explicitly specifying a name of the third party application 102 in the spoken utterance 112. Rather, the third party application 102 and/or one or more operations capable of being performed by the third party application 102 can be identified in response to the automated assistant receiving the spoken utterance 112.

FIG. 1B illustrates a view 120 of how the automated assistant can control one or more external applications and/or one or more associated operations in order to fulfill a user request embodied by the spoken utterance 112. For example, because the third party application 102 can be lacking or void of an API, library, and/or function intended for interfacing with an automated assistant, the automated assistant can employ one or more processes for converting automated assistant commands from the user to control instructions executable by the third party application 102. In some implementations, one or more trained machine learning models can be used when processing data that is available via the third party application 102 in order to identify input data for the third party application 102. For instance, a first trained machine learning model can be trained using one or more portions of one or more GUIs that can be rendered by the third party application 102. Additionally, a second trained machine learning model can be trained using natural language content associated with a request for one or more operations to be performed by the third party application 102.

Each respective trained machine learning model can be used to generate a respective embedding for a shared embedding space 126. The shared embedding space 126 can include vectors and/or points that represent mappings of natural language queries and GUI elements. For example, a correlation 130 between a selectable GUI element for controlling kitchen lights can map to a particular point in the shared embedding space 126. The particular point corresponding to the selectable GUI element can result from prior training of a machine learning model and/or other processing resulting in the shared embedding space. In order to determine whether an input from the user corresponds to a particular operation that capable of being performed via interaction with the third party application 102, the input can be processed in order to determine a distance of the input in the shared embedding space 126 from other vectors and/or points in the shared embedding space 126. In some implementations, assistant input data 124 can be processed at the computing device 108 and/or a separate computing device 122. Based on this processing, the assistant input data 124, which can correspond to the spoken utterance 112 provided by the user 110, can be mapped to a particular location within shared embedding space 126 that is stored as assistant data.

In some implementations, a correlation 132 of the assistant input data mapping, and a mapping for a particular selectable GUI element of the third party application 102, can have a distance from each other in the shared embedding space 126. When the distance satisfies a particular threshold, the particular selectable GUI element of the third party application 102 can be designated as associated with one or more operations the user 110 is requesting that the third party application 102 perform. In some implementations, the assistant input data 124 can include data characterizing one or more portions of a spoken utterance provided by the user 110 to the automated assistant. Therefore, when processing the assistant input data 124, one or more vectors and/or points in the shared embedding space 126 can be generated and/or identified.

When a location of a point, for the assistant input data 124, in the shared embedding space 126 satisfies a distance threshold to another location of another point corresponding to, for example, a "Kitchen Lights" GUI element, application operation data 128 can be generated based on this correlation. In some implementations, the application operation data 128 can characterize one or more inputs for initializing one or more operations capable of being performed in response to a user interacting with the "Kitchen Lights" GUI element. Additionally, or alternatively, the application operation data 128 can characterize one or more operations capable of being performed by the third party application 102. In some implementations, the application operation data 128 can be generated using one or more trained machine learning models and/or one or more heuristic techniques. For example, in response to determining that the assistant input data 124 is correlated with the "Kitchen Lights" GUI element, the application operation data 128 can be generated based previous interactions between the user and the third party application 102.

FIG. 1C illustrates a view 140 of the computing device 108 and/or the automated assistant providing application input data 142 to the third party application 102. In some implementations, the application input data 142 can be generated using the application operation data 128. For instance, the application operation data 128 can identify one or more operations that can be performed in order to satisfy a request embodied in the spoken utterance 112 from the user 110. Additionally, the application input data 142 can characterize one or more inputs that can be provided by the user 110 in order to initialize performance of the operations. For example, the application input data 142 can characterize a swipe gesture at a particular portion of the display panel 104 for moving the "Kitchen Lights" GUI element to an "off" setting, and another swipe gesture for decreasing a "Thermostat Setting" GUI element to a lower setting.

In some implementations, the application operation data 128 can be generated based on processing of application data that is stored in association with the third party application 102. For example, the application data can include XML data, accessibility data, programming comment data, annotations, support documentation, accessibility annotations, and/or any other data that can be stored in association with a third party application 102. Therefore, correlations between a GUI element (e.g., a thermostat dial) and a comment (e.g., "//GUI element for adjusting thermostat setting") in code related to the GUI element can be used when determining a particular input to provide to a third party application 102 in response a spoken utterance from the user 110 to the automated assistant. In some implementations, in order to determine a suitable input to provide, information that is processed and/or used for training a machine learning model can include natural language content rendered at a display interface, parameter data for a function of the third party application 102, slot value data for a function of the third party application 102, API data stored in association with the third party application 102 (e.g., API data that is for interfacing with other applications that do not include the automated assistant), and/or any other data that can be used to generate an input for an application.

Figure 2:
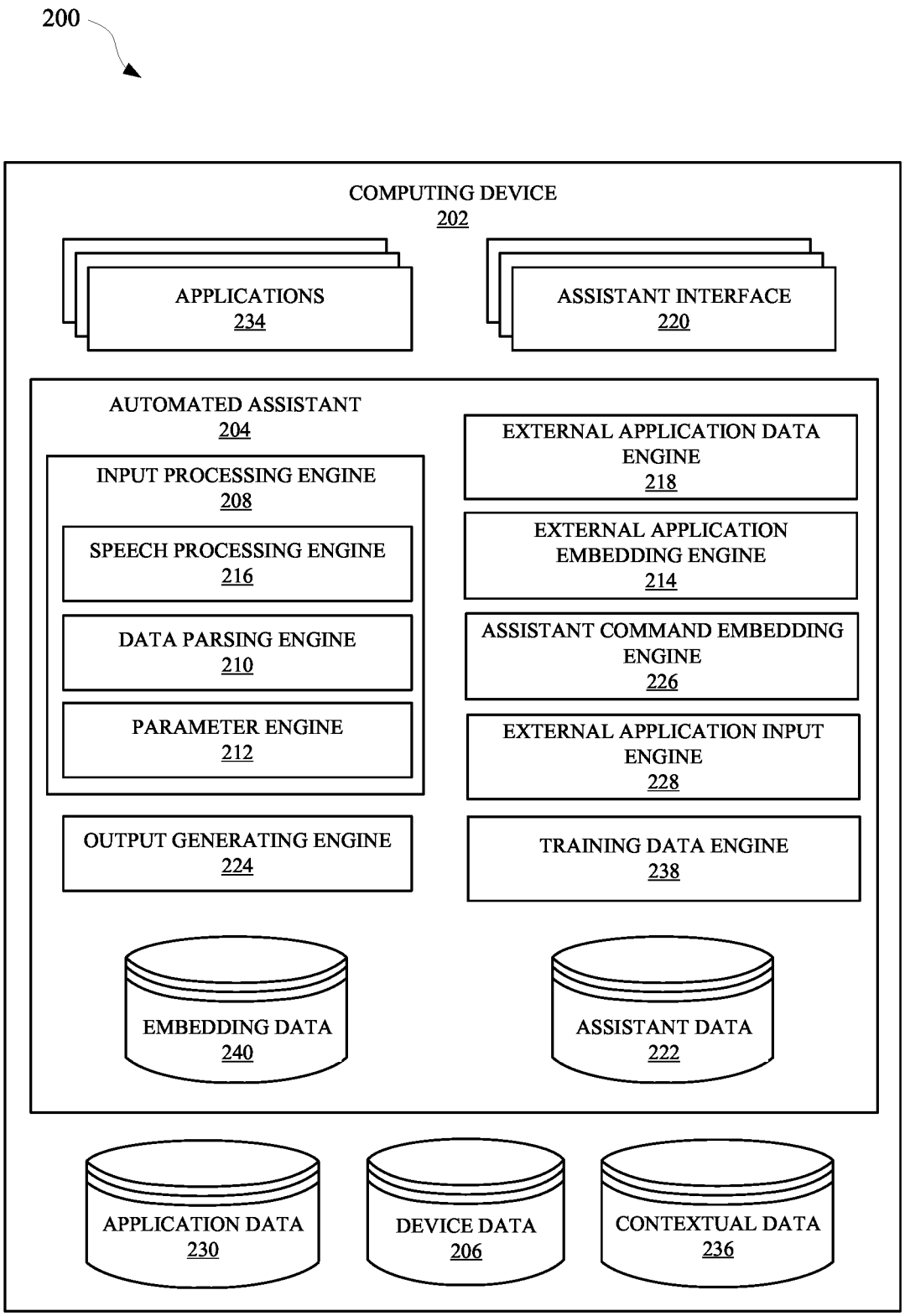
FIG. 2 illustrates a system for providing an automated assistant that is capable of instructing non-automated assistant applications to perform various functions, without such non-automated assistant applications being pre-configured to interact with the automated assistant.

FIG. 2 illustrates a system 200 for providing an automated assistant 204 that is capable of instructing non-automated assistant applications to perform various functions, without such non-automated assistant applications being pre-configured to interact with the automated assistant 204. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to perform a function (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204.

The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be without a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 222 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 224. The output generating engine 224 can use the one or more parameters to communicate with an assistant interface 220 for providing an output to a user, and/or communicate with one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IOT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third party entity that is different from an entity that provided the computing device 202 and/or the automated assistant 204. In some implementations, one or more applications of the applications 234 can be lacking functionality for interfacing with an automated assistant. For example, one or more of the applications 234 can be lacking or void of an API, library, and/or function that explicitly identifies an automated assistant. In some implementations, an external application 234 can include one or more APIs, libraries, and/or functions that allow the automated assistant 204 to interface with the external application 234 for controlling certain operations, but not all operations, capable of being performed by the external application 234. For example, an entity that has created a particular application 234 can pre-load the application with certain operations that the automated assistant 204 can cause the particular application 234. However, the entity may not have explicitly created functionality for other operations (e.g., less popular functions) to be controlled by the automated assistant 204. For instance, a manufacturer may have provided an application 234 with scheduling functionality that can be controlled by a user via the automated assistant 204, but may have not provided messaging functionality that can be expressly controlled by the user via the automated assistant.

In order to interface with a non-assistant application, the automated assistant 204 can employ an external application data engine 218. The external application data engine 218 can process application data 230 that is stored in association with each application 234, and the application data 230 can include annotation data. The external application data engine 218 can identify the application data 230 in order to identify data that is suitable for use by the automated assistant 204 when instructing the external application to perform particular operations. For instance, the external application data engine 218 can identify annotation data that is suitable for use in determining a correlation between one or more requests from a user and one or more operations capable of being performed by a particular application 234.

In some implementations, the automated assistant 204 can include an external application embedding engine 214 that can process the application data identified by the external application data engine 218. In some implementations, the external application embedding engine 214 can identify and/or generate embedding data 240 from application data 230. For example, the external application embedding engine 214 can generate embedding data 240 from GUI data, annotation data, support data, and/or any other data that can be associated with an application. Furthermore, an assistant command embedding engine 226 can be included with the automated assistant 204 and/or computing device 202 in order to generate embedding data 240 based on an input provided by a user. For example, in response to receiving a spoken utterance from a user, the automated assistant 204 can use the assistant command embedding engine 226 to generate an input embedding for the spoken utterance. The input embedding can then be compared to embedding data 240 in order to determine one or more suitable operations for one or more application 234 and/or the automated assistant 204 to perform.

In some implementations, the external application embedding engine 214 can generate embedding data 240 for an embedding space in which various operation embeddings are mapped. For example, particular embedding data for a selectable GUI element of an external application can be mapped nearest to one or more operation embeddings. This can indicate that one or more of those nearest operation embeddings can be executed in response to a user interacting with the selectable GUI element. Furthermore, in response to an assistant input from a user, an input embedding can be generated and mapped nearest to an embedding in the embedding space. When a nearest embedding corresponds to one or more of the operation embeddings that are nearest to a particular embedding for the selectable GUI element, the automated assistant can identify the selectable GUI element as being a subject of forthcoming automated assistant instructions.

For example, the automated assistant 204 and/or the computing device 202 can include an external application input engine 228, which can determine one or more inputs to provide to an external application based on embeddings and/or a spoken utterance. For instance, when one or more operation embeddings are determined to be most proximate to a particular embedding for a selectable GUI element, the external application input engine 228 can determine one or more inputs to provide to a corresponding external application in order to simulate an interaction with the selectable GUI element. In some implementations, the one or more inputs can be determined based on a type of selectable GUI element that is identified (e.g., a scroll bar, switch, link, checkbox, etc.). In some implementations, the one or more inputs can be determined using one or more trained machine learning models that can be used to correlate an identified selectable GUI element to one or more inputs to be provided by the automated assistant to the external application. In response to receiving the one or more inputs, the external application can initialize performance of one or more operations requested to be performed by the user. In some implementations, the one or more inputs can be selected based on interaction data, which can be generated based on prior interactions between the user and the external application and/or the one or more trained machine learning models.

In some implementations, the automated assistant 204 can include a training data engine 238 that can generate, with prior permission from the user, instances of training data based on interaction data that characterizes interactions between the user and the automated assistant 204, between the user and the applications 234, and/or between the automated assistant 204 and the applications 234. For example, when the automated assistant successfully causes an external application to perform one or more operations in response to a user input to the automated assistant, the training data engine 238 can cause one or more models to be modified accordingly. In some implementations, in response to the automated assistant causing an external application to perform one or more operations in response to a request from a user to the automated assistant, features of an embedding space can be modified in order to improve an accuracy of a correlation between the request and the one or more operations.

Additionally, or alternatively, the training data engine 238 can generate suggested inputs for the user to provide to the automated assistant in order to cause one or more external applications to perform one or more operations. In some implementations, the training data engine 238 can generate content to be included in suggestions for a user to identify and respond to in order to cause the automated assistant 204 to instruct an external application to perform a particular operation. In response to a user selecting a particular suggestion (e.g., a suggestion GUI element), the training data engine 238 can generate one or more instances of training data characterizing a user input, the particular suggestion, content of the particular suggestion, one or more operations performed by the external application in response, and/or any other property of an interaction between a user, an automated assistant, and an external application. For example, an instance of training data can include input data that characterizes natural language content of the particular suggestion. The instance of training data can also include output data that characterizes one or more operations performed by one or more external applications. In some implementations, when a user elects to not respond to a suggestion generated by the training data engine 238, the training data engine 238 can generate a different instance of training data based on the lack of response of the user to the suggestion.

Figure 3:
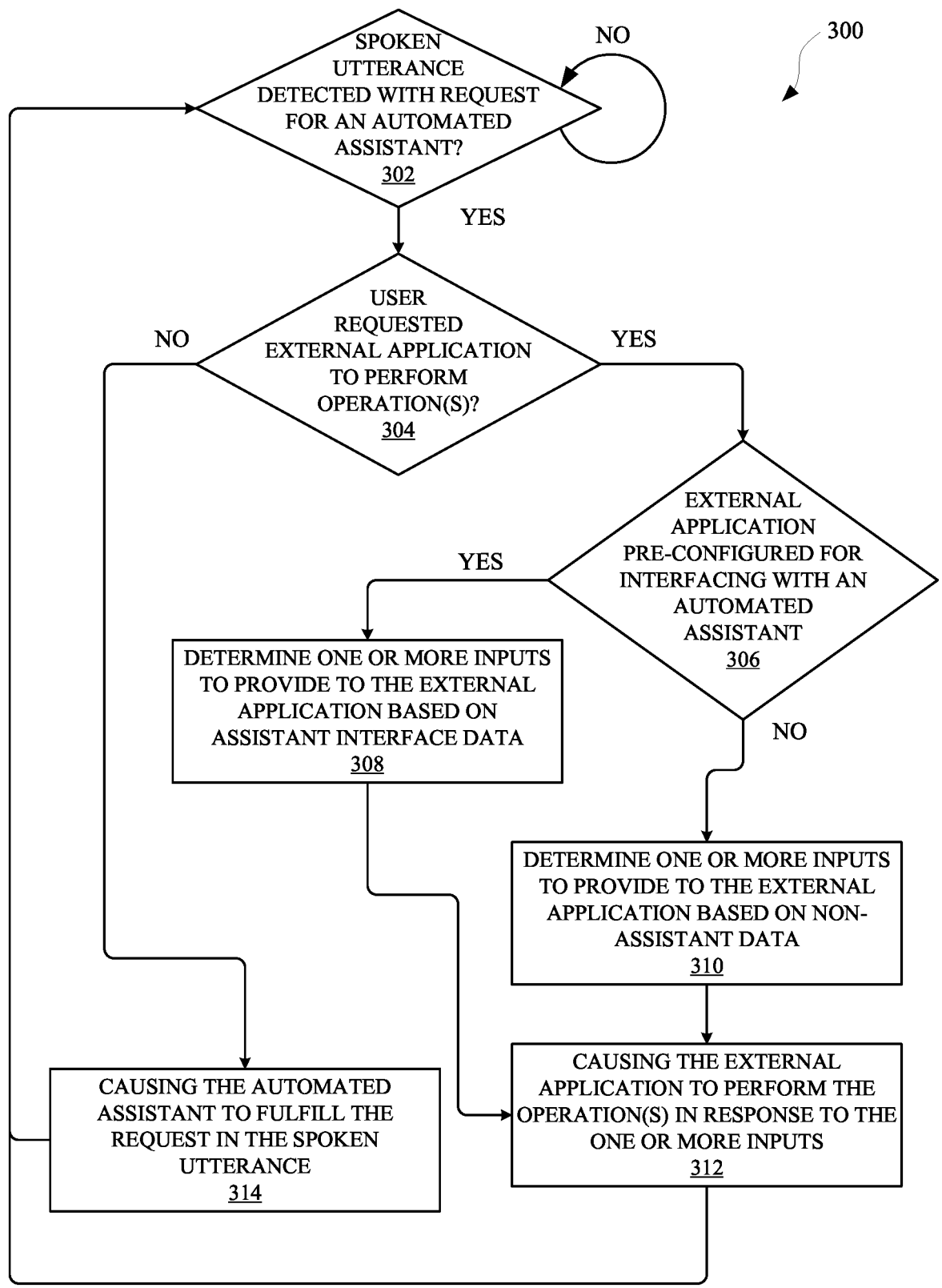
FIG. 3 illustrates a method for instructing an automated assistant to invoke an external application that is not pre-configured with a function that specifies the automated assistant as able to direct the external application to perform certain operations.

FIG. 3 illustrates a method 300 for instructing an automated assistant to invoke an external application that is not pre-configured with a function that specifies the automated assistant as able to direct the external application to perform various operations. The method 300 can be performed by one or more computing devices, applications, and/or any other apparatus or module that can be associated with an automated assistant. The method 300 can include an operation 302 of determining whether a spoken utterance from a user was detected, and whether the spoken utterance includes a request for the automated assistant. When the spoken utterance includes a request that is actionable by the automated assistant, the method 300 can proceed from the operation 302 to an operation 304. Otherwise, the automated assistant can continue to determine whether a spoken utterance was provided by a user and directed at the automated assistant.

The method 300 can proceed from the operation 302 to an operation 304, which can include determining whether the user requested performance of one or more operations by an external application. In some implementations, audio data corresponding to the spoken utterance can be processed in order to determine whether the user is requesting an automated assistant operation be performed or an external application operation be performed. This determination can be based on whether the user mentioned a particular external application, a particular external application operation, a particular automated assistant operation, and/or any other information that can be relevant to this determination. In some implementations, this determination can include assigning scores according to a relevance of a particular operation and/or application to a context in which the user provided the spoken utterance. For example, when the user is accessing a particular external application simultaneous to providing the spoken utterance, and the spoken utterance mentions an operation that the particular external application can perform, the score for the particular external application can be higher than a score assigned to the automated assistant (e.g., a score that indicates whether the automated assistant will perform the operation without invoking a separate application). An application that is assigned a highest score can then be identified as a target of a request from the user.

When the spoken utterance is determined to be a request for an external application to perform an operation(s), the method 300 can proceed to an operation 306. Otherwise, the operation can proceed from the operation 304 to an operation 314, which can include causing the automated assistant to fulfill the request included in the spoken utterance. The operation 306 can include determining whether the external application is pre-configured for interfacing with an automated assistant. When the external application is pre-configured for interfacing with an automated assistant, the external application can include one or more libraries, functions, APIs, parameters, data files, and/or any other module that directly or indirectly identifies the automated assistant.

In some implementations, when the external application is determined to be pre-configured for interfacing with an automated assistant, the method 300 can proceed from an operation 306 to an operation 308. The operation 308 can include determining and/or identifying one or more inputs to provide to the external application based on assistant interface data that is accessible via the external application. For instance, the external application may be associated with an automated assistant API for receiving and/or responding to requests from the automated assistant. Therefore, inputs to the external application from the automated assistant can be generated using the API and/or another source of input data. For example, input data can be generated based on prior interactions between one or more users and the external application, and/or one or more trained machine learning models that are trained using interaction data.

When the external application is determined to not be pre-configured for interfacing with an automated assistant, the method 300 can proceed from the operation 306 to an operation 310. The operation 310 can include determining and/or identifying one or more inputs to provide to the external application based on non-assistant data. In some implementations, the non-assistant data can be application data that is stored in association with the external application but not does explicitly identify the automated assistant. In some implementations, the non-assistant data can be annotation data that is included in data files stored at a computing device on which the external application is installed, or a separate computer that is in communication with the computing device. The annotation data can include accessibility data, GUI element descriptions, images, videos, comment data, XML data, and/or any other data that can be stored in association with an application. In some implementations, one or more inputs to be provided to the external application can be selected based on one or more machine learning models. For example, the machine learning models can include a first trained machine learning model that is trained using external application GUI data, and a second trained machine learning model that is trained using assistant input data. Therefore, a correspondence between the external application GUI data and the assistant input data can be mapped in order to identify suitable inputs to provide the external application and/or a corresponding GUI in response to a spoken automated assistant input.

The method 300 can proceed from the operation 308, or the operation 310, to an operation 312. The operation 312 can include causing the external application to perform the operation in response to the one or more inputs. For example, the spoken utterance, "Assistant, check into the gym," can be provided to a computing device that includes the automated assistant and a health application. In response, the automated assistant can determine that the user is requesting the automated assistant to cause their health application to acknowledge a Bluetooth beacon located at a fitness gym. The health application and/or the automated assistant may not include a suitable API that supports such interaction, therefore the automated assistant can access non-automated assistant data stored in association with the health application in order to generate input(s) that may be suitable to cause the health application to acknowledge the Bluetooth beacon.

For example, audio data corresponding to the spoken utterance can be processed using a trained machine learning model in order to generate an embedding, which can correspond to one or more GUI elements of the health application. When the GUI elements have been identified, the automated assistant can determine one or more inputs to provide to the health application in order to simulate user interaction with the one or more GUI elements. In response to the health application receiving the one or more inputs, the health application can initialize and acknowledge the Bluetooth beacon in order to fulfill a request embodied in the spoken utterance from the user to the automated assistant. Thereafter, the automated assistant can return to determining whether the user has provided another spoken utterance to the automated assistant at operation 302.

Figure 4:
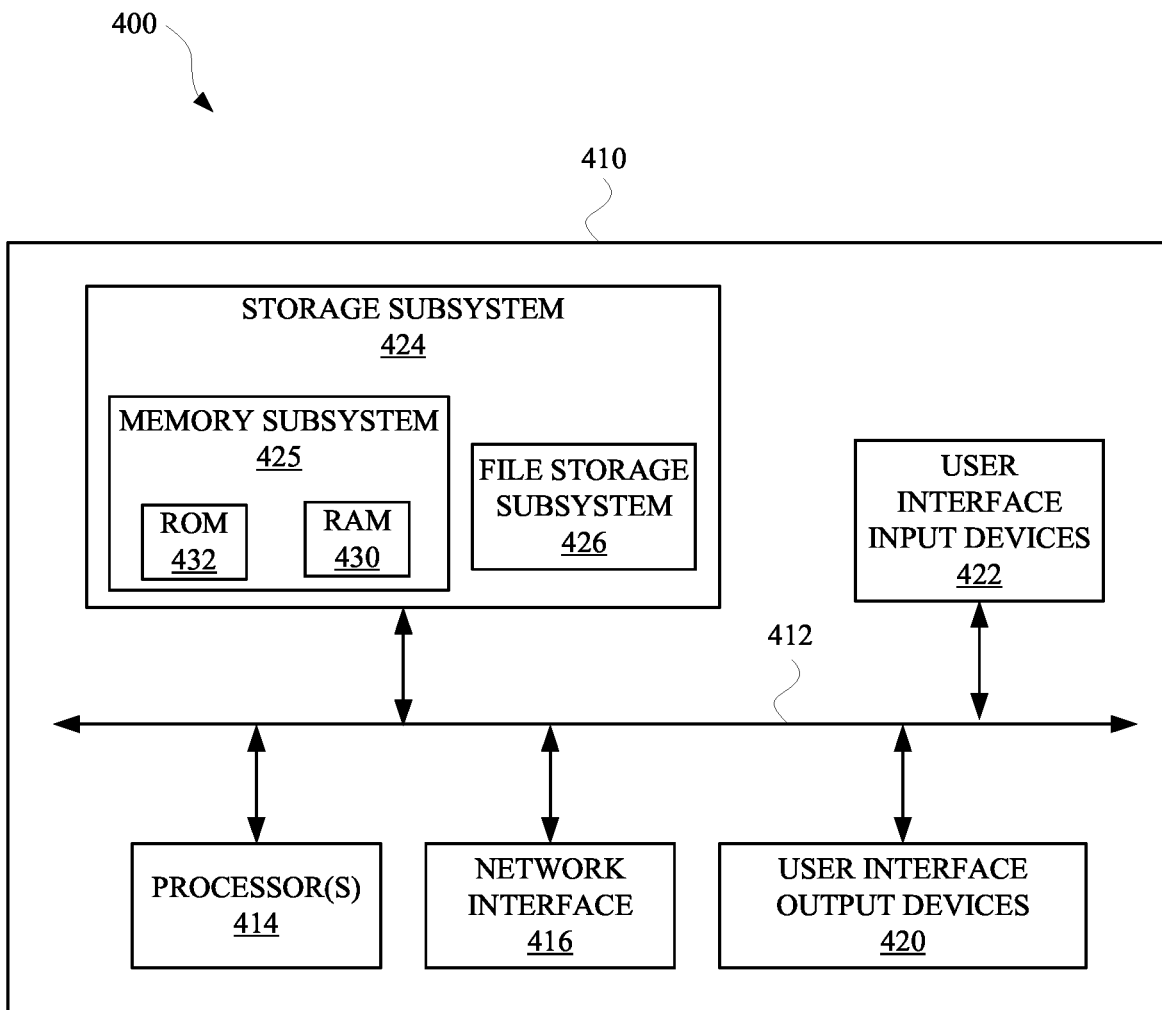
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 108, computing device 122, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, at a computing device, that a user has provided a spoken utterance that is directed to an automated assistant that is accessible via the computing device, wherein the spoken utterance does not explicitly identify a name of any application that is different from the automated assistant. The method can further include an operation of processing, in response to determining that the user provided the spoken utterance, input data characterizing the spoken utterance to identify one or more operations that are associated with a request embodied in the spoken utterance, wherein the one or more operations are executable via a particular application that is separate from the automated assistant, and wherein the particular application is void of an application programming interface (API) via which the one or more operations of the particular application can be controlled by the automated assistant. The method can further include an operation of generating, based on processing the input data, one or more application inputs for the particular application, wherein the one or more application inputs are generated using interaction data that provides a correlation between the one or more operations and the one or more application inputs. The method can further include an operation of causing, based on generating the one or more application inputs, the automated assistant to provide the one or more application inputs to the particular application, wherein providing the one or more application inputs to the particular application causes the particular application to perform the one or more operations and fulfill the request embodied in the spoken utterance.

In some implementations, processing the input data to identify the one or more operations includes: processing the input data, using a trained neural network model, to generate output that indicates a first location in an embedding space; determining a distance measure between the first location in the embedding space and a second location, in the embedding space, that corresponds to the one or more operations;

and identifying the one or more operations based on the distance measure satisfying a distance threshold. In some implementations, the neural network model is trained using instances of training data that are based on previous interactions between the user and the particular application. In some implementations, the second location, in the embedding space, is generated based on processing, using an additional trained neural network model, one or more features of a particular application graphical user interface (GUI) of the particular application, wherein the one or more features correspond to the one or more operations. In some implementations, the one or more features of the particular application GUI comprise a particular selectable element of the GUI, and wherein the one or more application inputs comprise an emulated selection of the particular selectable element. In some implementations, the interaction data includes a trained machine learning model that is trained based on prior interactions between one or more users and the particular application.

In some implementations, the trained machine learning model is trained using at least one instance of training data that identifies a natural language input as training input and, as training output, an output operation capable of being performed by the particular application. In some implementations, the trained machine learning model is trained using at least an instance of training data that includes, as training input, graphical user interface (GUI) data characterizing a particular application GUI and, as training output, an output operation capable of being initialized via user interaction with the particular application GUI. In some implementations, the one or more operations are capable of being initialized by the user via interaction with the particular application, and without the user initializing the automated assistant. In some implementations, processing the input data to identify the one or more operations that are associated with the request embodied in the spoken utterance includes: determining that the particular application is causing an application GUI to be rendered in a foreground of the display interface of the computing device, and determining that one or more selectable GUI elements of the application GUI are configured to initialize performance of the one or more operation in response to the user interacting with the one or more selectable GUI elements.

In other implementations, a method implemented by one or more processors is set forth as including operations such as causing, at a computing device, a suggestion graphical user interface (GUI) element to be rendered at a display interface of the computing device, wherein the suggestion GUI element includes natural language content embodying a suggested command for a user to provide to an automated assistant that is accessible via the computing device, wherein the suggested command corresponds to a request for the automated assistant to cause a particular application to perform one or more operations, and wherein the particular application is void of a function that allows the particular application to be controlled by the automated assistant without the user initializing the particular application prior to the automated assistant controlling the particular application. In some implementations, the method can further include an operation of, when the user provides a spoken utterance that includes the suggested command: generating an instance of training data that indicates the user provided the suggested command as an input to the automated assistant, wherein the instance of training data is generated for training a machine learning model that can be used for processing a subsequent spoken utterance from the user.

In some implementations, the method can further include an operation of, when the user does not provide the spoken utterance that includes the suggested command within a threshold period of time: generating another instance of training data that indicates the user did not provide the suggested command as input to the automated assistant, wherein the other instance of training data is generated for training the machine learning model that can be used for processing the subsequent spoken utterance from the user. In some implementations, causing the suggestion GUI element to be rendered at the display interface of the computing device includes: causing the suggestion GUI element to be rendered in a foreground of the display interface of the computing device when the particular application is also being rendered at the display interface of the computing device. In some implementations, causing the suggestion graphical user interface (GUI) element to be rendered at the display interface of the computing device includes: processing annotation data that is stored in association with the particular application, wherein the annotation data includes natural language content that is associated with the one or more operations.

In yet other implementations, a method implemented by one or more processors is set forth as including operations such as initializing, at a computing device, a particular application that is accessible via the computing device, wherein the computing device also provides access to an automated assistant, and wherein the particular application is void of a function that allows one or more operations of the particular application to be controlled by the automated assistant. In some implementations, the method can further include an operation of causing, in response to initializing the particular application, a graphical user interface (GUI) to be rendered at a display interface of the computing device, wherein the particular application includes application data that characterizes the one or more operations, which are capable of being initialized in response to an input from the user to the GUI of the particular application. In some implementations, the method can further include an operation of receiving, from the automated assistant, a request for the particular application to perform the one or more operations, wherein the request is provided by the automated assistant in response to the automated assistant receiving an input from the user. The method can further include an operation of causing, in response to receiving the request from the automated assistant, the particular application to perform the one or more operations.

In some implementations, receiving the request from the automated assistant includes: determining that the request identifies a particular GUI element that is being rendered at the display interface of the computing device. In some implementations, receiving the request from the automated assistant includes: determining that the request includes input data for simulating user interaction with a particular GUI element that is being rendered at the display interface of the computing device. In some implementations, the particular application is void of an application programming interface (API) via which the particular application can direct the automated assistant to perform an action. In some implementations, the one or more operations are capable of being initialized by the user via interaction with the particular application, and without the user invoking the automated assistant. In some implementations, the request provided by the automated assistant is based on a trained machine learning model that is trained using instances of training data that are generated using at least some of the application data. In some implementations, the application data includes annotation data that is included in one or more executable files that are stored in association with the particular application.

We claim:

1. A method implemented by one or more processors, the method further comprising:
   causing, at a computing device, a suggestion graphical user interface (GUI) element to be rendered at a display interface of the computing device,
      wherein the suggestion GUI element includes natural language content embodying a suggested command for a user to provide to an automated assistant that is accessible via the computing device,
      wherein the suggested command corresponds to a request for the automated assistant to cause a particular application to perform one or more operations, and
      wherein the particular application is void of a function that allows the particular application to be controlled by the automated assistant without the user initializing the particular application prior to the automated assistant controlling the particular application;
      wherein causing the suggestion GUI element to be rendered at the display interface of the computing device includes:
         causing the suggestion GUI element to be rendered in a foreground of the display interface of the computing device when the particular application is also being rendered at the display interface of the computing device; and
   when the user provides a spoken utterance that includes the suggested command:
      generating an instance of training data that indicates the user provided the suggested command as an input to the automated assistant,
         wherein the instance of training data is generated for training a machine learning model that can be used for processing a subsequent spoken utterance from the user.

2. The method of claim 1, further comprising:
   when the user does not provide the spoken utterance that includes the suggested command within a threshold period of time:
      generating an additional instance of training data that indicates the user did not provide the suggested command as input to the automated assistant,
         wherein the additional instance of training data is generated for training the machine learning model that can be used for processing the subsequent spoken utterance from the user.

3. The method of claim 1, wherein causing the suggestion graphical user interface (GUI) element to be rendered at the display interface of the computing device includes:
   processing annotation data that is stored in association with the particular application,
      wherein the annotation data includes natural language content that is associated with the one or more operations.

4. A method implemented by one or more processors, the method comprising:
   initializing, at a computing device, a particular application that is accessible via the computing device,
      wherein the computing device also provides access to an automated assistant, and
      wherein the particular application is void of a function that allows one or more operations of the particular application to be controlled by the automated assistant; and
   causing, in response to initializing the particular application, a graphical user interface (GUI) to be rendered at a display interface of the computing device,
      wherein the particular application includes application data that characterizes the one or more operations, which are capable of being initialized in response to an input from the user to the GUI of the particular application;
   receiving, from the automated assistant, a request for the particular application to perform the one or more operations,
      wherein the request is provided by the automated assistant in response to the automated assistant receiving an input from the user; and
      wherein receiving the request from the automated assistant includes determining that the request identifies a particular GUI element that is being rendered at the display interface of the computing device; and
   causing, in response to receiving the request from the automated assistant, the particular application to perform the one or more operations.

5. The method of claim 4, wherein receiving the request from the automated assistant includes:
   determining that the request includes input data for simulating user interaction with a particular GUI element that is being rendered at the display interface of the computing device.

6. The method of claim 4, wherein the particular application is void of an application programming interface (API) via which the particular application can direct the automated assistant to perform an action.

7. The method of claim 4, wherein the one or more operations are capable of being initialized by the user via interaction with the particular application, and without the user invoking the automated assistant.

8. The method of claim 4, wherein the request provided by the automated assistant is based on a trained machine learning model that is trained using instances of training data that are generated using at least some of the application data.

9. The method of claim 4, wherein the application data includes annotation data that is included in one or more executable files that are stored in association with the particular application.

10. A method implemented by one or more processors, the method comprising:
    initializing, at a computing device, a particular application that is accessible via the computing device,
       wherein the computing device also provides access to an automated assistant, and
       wherein the particular application is void of a function that allows one or more operations of the particular application to be controlled by the automated assistant; and
    causing, in response to initializing the particular application, a graphical user interface (GUI) to be rendered at a display interface of the computing device,
       wherein the particular application includes application data that characterizes the one or more operations, which are capable of being initialized in response to an input from the user to the GUI of the particular application;

receiving, from the automated assistant, a request for the particular application to perform the one or more operations,
- wherein the request is provided by the automated assistant in response to the automated assistant receiving an input from the user; and
- wherein receiving the request from the automated assistant includes determining that the request includes input data for simulating user interaction with a particular GUI element that is being rendered at the display interface of the computing device; and causing, in response to receiving the request from the automated assistant, the particular application to perform the one or more operations.

11. The method of claim 10, wherein receiving the request from the automated assistant includes:
- determining that the request identifies a particular GUI element that is being rendered at the display interface of the computing device.

12. The method of claim 10, wherein the particular application is void of an application programming interface (API) via which the particular application can direct the automated assistant to perform an action.

13. The method of claim 10, wherein the one or more operations are capable of being initialized by the user via interaction with the particular application, and without the user invoking the automated assistant.

14. The method of claim 10, wherein the request provided by the automated assistant is based on a trained machine learning model that is trained using instances of training data that are generated using at least some of the application data.

15. The method of claim 10, wherein the application data includes annotation data that is included in one or more executable files that are stored in association with the particular application.

* * * * *